UNITED STATES PATENT OFFICE.

FRANK WILLIS, OF OTONABEE TOWNSHIP, CANADA.

COMBINED COFFEE PACKAGE AND CLARIFIER.

SPECIFICATION forming part of Letters Patent No. 676,808, dated June 18, 1901.

Application filed November 5, 1900. Serial No. 35,469. (No model.)

*To all whom it may concern:*

Be it known that I, FRANK WILLIS, a citizen of the United States, residing in the township of Otonabee, county of Peterborough, and Province of Ontario, Canada, have invented a new and useful Improvement in a Combined Coffee Package and Clarifier, of which the following is a specification.

My invention relates to packages of roasted and ground coffee ready for use, and has for its object to provide a means by which a sufficient quantity of coffee for one or more cups may be used without exposing the remaining mass to the air, whereby it would lose strength and aroma, and to furnish a clarifier which is combined with the envelop or container. The said containers or envelops are made of a fine fish-gelatin combined with or containing a substance such as egg-albumen or any other suitable coffee-clarifier. I prefer to make each container of a size to hold about one ounce of roasted and ground coffee, and each of these containers has embodied in or combined with the gelatin a sufficient amount of clarifier for the quantity of ground or powdered coffee contained in the package.

Of course I may make my containers or envelops of different sizes, it being understood that in any case there is to be the proper amount of clarifier combined with the gelatin to "settle" the amount of coffee contained therein. In making these envelops or containers I combine the gelatin and clarifying substance in the following proportions: gelatin, from one-fourth of a dram to one ounce, and albumen, from one and one-fourth ounces to six ounces.

Having fully described my invention, what I claim, and desire to secure by Letters Patent of the United States, is—

1. As a new article of manufacture, a package of roasted and ground coffee contained in an envelop composed of a mixture of gelatin and an additional clarifying material, as set forth.

2. As a new article of manufacture, a package of roasted and ground coffee contained in an envelop composed of a mixture of gelatin and albumen, as set forth.

3. An envelop or container for roasted and ground coffee, composed of gelatin and an additional clarifying material, as set forth.

4. An envelop or container for roasted and ground coffee, composed of gelatin and albumen, as set forth.

In testimony whereof I have signed my name to this specification in the presence of two subscribing witnesses.

FRANK WILLIS.

Witnesses:
   G. W. HATTON,
   M. E. E. COOKE.